(12) United States Patent
Revol et al.

(10) Patent No.: US 9,417,330 B2
(45) Date of Patent: Aug. 16, 2016

(54) RECEIVER OF SATELLITE SIGNALS SERVING FOR LOCATION

(71) Applicant: THALES, Neuilly-sur-Seine (FR)

(72) Inventors: Marc Revol, Valence (FR); David Depraz Depland, Valence (FR)

(73) Assignee: Thales, Courbevoie (FR)

( * ) Notice: Subject to any disclaimer, the term of this patent is extended or adjusted under 35 U.S.C. 154(b) by 496 days.

(21) Appl. No.: 13/917,527

(22) Filed: Jun. 13, 2013

(65) Prior Publication Data

US 2013/0335264 A1 Dec. 19, 2013

(30) Foreign Application Priority Data

Jun. 15, 2012 (FR) ...................... 12 01711

(51) Int. Cl.
*G01S 19/09* (2010.01)
*G01S 19/42* (2010.01)
*G01S 19/22* (2010.01)

(52) U.S. Cl.
CPC ........ *G01S 19/42* (2013.01); *G01S 19/22* (2013.01)

(58) Field of Classification Search
CPC .............................. G01S 19/09; G01S 5/0036
USPC ............ 342/357.21, 357.25, 357.46, 357.61; 701/468, 469, 478.5
See application file for complete search history.

(56) References Cited

U.S. PATENT DOCUMENTS

| | | | | |
|---|---|---|---|---|
| 4,103,302 A | * | 7/1978 | Roeder ................ | G01S 13/605 342/113 |
| 4,914,441 A | * | 4/1990 | Brookner ............... | G01S 13/22 342/161 |
| 5,781,152 A | | 7/1998 | Renard et al. | |
| 6,218,984 B1 | * | 4/2001 | Longaker .............. | G01S 19/11 342/357.27 |
| 7,382,313 B1 | | 6/2008 | Goad | |
| 2007/0285308 A1 | * | 12/2007 | Bauregger ............ | G01S 19/10 342/357.27 |
| 2012/0119951 A1 | | 5/2012 | Vollath | |

FOREIGN PATENT DOCUMENTS

EP    1775599 A1    4/2007
FR    2742612 A1    6/1997

* cited by examiner

*Primary Examiner* — Dao Phan
(74) *Attorney, Agent, or Firm* — Baker & Hostetler LLP (57) ABSTRACT

A receiver of satellite signals serving for location (GNSS) adapted to be fixed on a support having at least one antenna able to receive the satellite signals serving for location. The antenna includes at least two mobile phase centers for determining a location on the basis of the satellite signals received, and a displacement device adapted for displacing the phase centers, for selecting one of the phase centers and for determining a position of the selected phase center with respect to the support.

5 Claims, 6 Drawing Sheets

RECEIVER OF SATELLITE SIGNALS SERVING FOR LOCATION

CROSS-REFERENCE TO RELATED APPLICATION

This application claims priority to foreign French patent application No. FR 1201711, filed on Jun. 15, 2012, the disclosure of which is incorporated by reference in its entirety.

FIELD OF THE INVENTION

The present invention relates to a receiver of satellite signals serving for location. These satellite signals are for example of GNSS type. The receiver is adapted to be fixed to a support.

BACKGROUND

Within the framework of receivers of satellite signals serving for location, the presence of potential slowly varying multipaths of high level degrades the reception of the location satellite signals. This degradation in precision is due in particular to the disturbance, in an inhomogeneous manner, of the measurements of the code phase and of the carrier phase of the signals originating from the satellites. Within the framework of marine applications, these multipaths are caused by the reflection, on the structures of the ship or on the surface of the water, of the satellite signals. Still within the framework of marine applications, the satellite location systems for which the degradation of the precision is the most problematic are, for example, the systems used to carry out deck landings.

In order to improve satellite signals reception performance, in the presence of multipaths, it is known to add a spatial filtering. This spatial filtering may be carried out using a directional reception antenna. These antennas are known by the acronym "FRPA" for Fixed Radiated Pattern Antenna. These antennas make it possible to achieve a compromise between the following two processing operations:
1) detection of the satellite signals (the latter generally arriving with an angle of elevation of typically greater than 5°) and
2) rejection of the multipaths and sources of interference (the former generally arriving with an angle of elevation of typically less than 10°).

These antennas are of relatively reduced cost. These are for example antennas known as "Choke-ring" or antennas of helical type. The major drawbacks of antennas with fixed radiation pattern of FRPA type are that the compromise between the detection of the satellite signals and the rejection of the multipaths and sources of interference is very difficult to achieve at low elevation, and also that such antennas with fixed radiation pattern do not allow adaptation of the receiver to modifications of the local reception environment, and this may involve constraints on the installation of the antenna.

It is also known in the prior art to protect the antenna by virtue of mechanical structures known as "IMLP" for "Interference Multipath Local Protection". These mechanical structures allow better mastery of the reflections. But such structures exhibit the major drawback of being bulky, typically a diameter of 5 to 10 meters and a height of 2 to 3 meters, of being expensive because of the absorbent materials used and of not contributing significantly to interference reduction.

It is also known in the prior art to carry out frequency and temporal filtering. This filtering is carried out by a device placed in the receiver. The type of filtering device used generally depends on the nature of the disturbance. In order to suppress interference it is known to use an analogue filtering of radio frequency type (in order to suppress the interference received outside of the band of the useful signal), or to carry out a filtering on the amplitudes known by the term "pulse-blanking" (or "pulse blocking") in the case where the interference is pulsed and received within the band of the useful signal or else a narrowband frequency-wise digital filtering. The difference between radio frequency filtering and frequency-wise digital filtering is that the former is generally performed on the analogue signal at its reception frequency with the aid of discrete filters of ceramic or "SAW" ("Surface Acoustic Wave") type, whereas the frequency-wise digital filtering is carried out only once the signal has been digitized and sampled, therefore at lower frequency (generally at the intermediate frequency, "IF"). Frequency-wise digital filtering permits notably adaptive filterings which are not achievable in analogue mode and make it possible to reject interference received in the useful reception band. In order to suppress the disturbances caused by multipaths, use is made of estimators of time received (also known as code discriminators) adapted to the deformations induced on the correlation function, such as, for example, NC discriminators (standing for "Narrow Correlator"), double delta discriminators (presented for example in the reference patent FR 2 742 612), MEDLL discriminators (standing for "Multipath Estimating Delay Lock Loop"). It is also possible to use the "SAGE" scheme (standing for "Space-Alternating Generalized Expectation Maximization"). However, on account of their specialization, these techniques are optimal only within a restricted domain of assumptions relating to the nature of the disturbance. These techniques therefore require the implementation of as many dedicated algorithms as types of different disturbances. This impacts the quality of the measurements determined on the basis of the signals received, notably the stability of the phase biases and the coherence between the code phase and the carrier phase. Moreover, this large number of algorithms complicates the step of validating the performance of the location system.

It is also known to use adaptive spatial processing based on a multiple antenna (for example the processing known by the term "CRPA" for "Controlled Reception Pattern Antenna" or by the term beam-forming antenna). A multiple antenna is an antenna consisting of a plurality of elementary antennas. This processing makes it possible to adapt the reception pattern of the antenna, automatically and without a priori knowledge of the configuration of the installation site (in particular without knowledge of the angle of elevation of the direction of arrival of the multipaths and of the interference). This adaptation makes it possible to maximize the reception power of the direct paths and to minimize the reception power of the reflected paths and of the interference. However this processing exhibits the drawback of increasing the complexity of the antennas and of the various elements performing the processing. Moreover this processing requires the calibration of the analogue elements of the receiver. The elements to be calibrated are in particular the antennas and the various elements of the radio frequency chain.

SUMMARY OF THE INVENTION

The present invention is therefore aimed at remedying these problems and proposes a location system having improved performance in the presence of multipaths, that does not require any voluminous antennas, that is able to adapt dynamically to the environment and that exhibits low calculational complexity.

There is proposed in accordance with one aspect of the invention a receiver of satellite signals serving for location and adapted to be fixed on a support. This receiver comprises at least one antenna able to receive the satellite signals serving for location, this antenna comprising at least two mobile phase centers. The receiver also comprises determination means for determining a location on the basis of the said satellite signals received and displacement means adapted for displacing the phase centers, for selecting one of the said phase centers and for determining a position of the selected phase center with respect to the support.

The receiver makes it possible to have improved performance, since it makes it possible to reduce the disturbances caused by these multipaths and sources of interference, by virtue of the short-term filtering of the fast phase measurement errors induced by the controlled motion of the antenna, doing so independently of any constraint on the direction of arrival of the disturbances.

In this case, it is possible to dispose a phase center every 10 cm over a circle 30 cm in radius. Switchover from one phase center to another phase center is carried out every second.

This antenna architecture allows easy integration of this receiver into existing systems or easy reuse of existing components for the production of the receiver.

Moreover the selection of a single phase center from among the plurality of phase centers of the antenna makes it possible to carry out an "apparent displacement" of the phase center of the reception signal (thereby making it possible to suppress the effect of the multipaths).

According to a technical characteristic, the determination means are adapted for determining a location, on the basis of the position of the selected phase center with respect to the support. This position is transmitted by the displacement means to the determination means. The determination means take this position into account in order to perform the correction of the variation of the phase of the signal received, caused by the displacement of the selected phase center.

This makes it possible to ensure the stability of the phase center of the useful satellite signals by a phase correction corresponding to the position of the sensor, at the moment of its selection, with respect to an arbitrary reference point of the antenna. Moreover the synchronization of this phase correction with the switching of the selection of the phase center makes it possible to avoid any phase break at reception. Moreover with respect to a variable weighting of the signal received from the various phase centers before summation of the set of weighted signals, the invention does not exhibit the disadvantage of increasing the phase noise on the useful signal.

According to a technical characteristic, the displacement means are adapted for displacing at least one of the reception antennas.

A possible example of displacement of the antenna in this case is a circular motion of an antenna situated at the extremity of an arm of 30 cm. This circular motion is carried out at 20°/sec. This makes it possible to traverse approximately a half-wavelength of the carrier signal per second.

This antenna architecture allows easy integration of this receiver into existing systems or easy reuse of existing components for the production of the receiver.

Advantageously, the means for determining a location comprise first sub-means for multiplying the satellite signal by a signal generated in the receiver and having a frequency dependent on the frequency of the carrier of the satellite signal, in order to obtain a first signal. The determination means also comprise second sub-means for multiplying the first signal by a signal generated in the receiver and having a carrier phase dependent on the position of the phase center, in order to obtain a second signal. The determination means moreover comprise sub-means for demodulating the second signal, in order to obtain a third signal. Finally the determination means comprise sub-means for integrating the third signal over a period dependent on the period of displacement of the phase center.

Advantageously, the means for determining a location comprise first sub-means for multiplying the satellite signal by a signal generated in the receiver and having a frequency dependent on the frequency of the carrier of the satellite signal, in order to obtain a fourth signal. The means for determining a location also comprise sub-means for demodulating the fourth signal, in order to obtain a fifth signal. The means for determining a location also comprise second sub-means for multiplying the fifth signal by a signal generated in the receiver and having a carrier phase dependent on the position of the phase center, in order to obtain a sixth signal. Finally the means for determining a location comprise sub-means for integrating the sixth signal over a period dependent on the period of displacement of the phase center.

These two proposed architectures of the receiver allow easy integration of this receiver into existing systems or easy reuse of existing components for the production of the receiver.

Advantageously, the second multiplying sub-means are adapted for generating a signal having a frequency dependent on the projection of the speed of displacement vector of the phase center in the direction of reception of the satellite signal.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION

Figure 1:
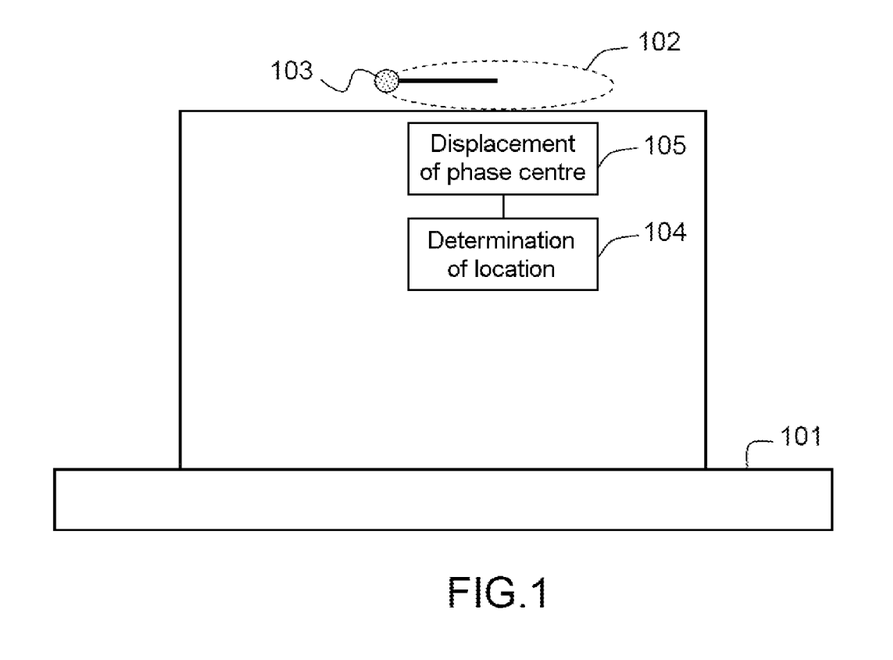
FIG. 1 presents the receiver according to one aspect of the invention.

The receiver such as presented in FIG. 1 may be fixed on a support 101. This support is for example a terrestrial, naval or aerial vehicle but it may also be a ground station. The receiver comprises an antenna 102 for receiving a satellite signal serving for location. This antenna comprises at least one mobile phase center 103. The phase center is a theoretical point of the antenna, characterized by the stability of the phase response as a function of the angle of incidence of the signal on the antenna according to azimuth and elevation, generally at the central frequency of the useful reception band. The receiver moreover comprises a device 104 for determining a location on the basis of the signals received. Devices allowing the determination of a location are known to the person skilled in the art. The receiver also comprises a device 105 for displacing the phase center with respect to the support. This displacement of the phase center may be carried out in a mechanical manner or else by electronic switching on an array of several antennas having different phase centers. The use of electronic switching makes it possible to avoid sources of wear and of non-reliability. It also makes it possible to use the whole extent of the antenna array, without however complicating the processing of the receiver (with respect to the case of a conventional array antenna processing which requires the simultaneous and parallel processing of the N sensors of the antenna array).

The motion of the phase center creates a variation in the phase noise which in itself makes it possible to improve location performance. However in an improved version of the system it is possible for the device 104 for determining a location to be adapted to perform this determination using the position of the phase center. This position of the phase center is transmitted to the device 104 for determining a location by the displacement device 105.

The receiver, in order to limit the effect of the multipaths and of the sources of interference, uses antennas whose phase center is mobile. This displacement of the phase center makes it possible to create a dummy Doppler effect on the reflected path and the sources of interference. This dummy Doppler effect can thereafter be eliminated by temporal filtering (phase loop filter, code-carrier filter, etc.). Depending on the expected level of precision, the phase of the satellite signal can also be kept stationary by compensating for the motion of the antenna in relation to the axes of the support. This motion of the support can be determined by a priori modelling, measured on the drive device or estimated with inertial sensors or inertial measurement units (IMU).

By virtue of this displacement, the signal received directly from the satellite has a stationary phase, whereas the signals received after one or more reflections or the signals received from the sources of interference have a randomly varying phase. The displacement of the phase center causes a rotation between the phase of the direct signal and the phase of the reflected signals or of the interfering signals. This phase rotation then causes constructive and destructive combinations of the autocorrelation function of the signal received. These variations of the amplitude of the autocorrelation function can easily be suppressed through the use of the satellite tracking loops (known also by the acronym "DLL" for "Delay-locked loop") or by reducing the loop band (this being equivalent to increasing the duration of integration).

In the case of a mobile phase center and of a fixed object causing specular reflection, the signal received results from the superposition of a direct signal travelling a satellite to reception antenna path and of a reflected signal travelling a satellite to plane of specular reflection and then plane of specular reflection to reception antenna path.

The change of the phase of the signal received directly and of the signal received after reflection depends on the speed and the direction of displacement of the phase center with respect to the plane of reception of the signal received directly from the satellite.

Figure 2:
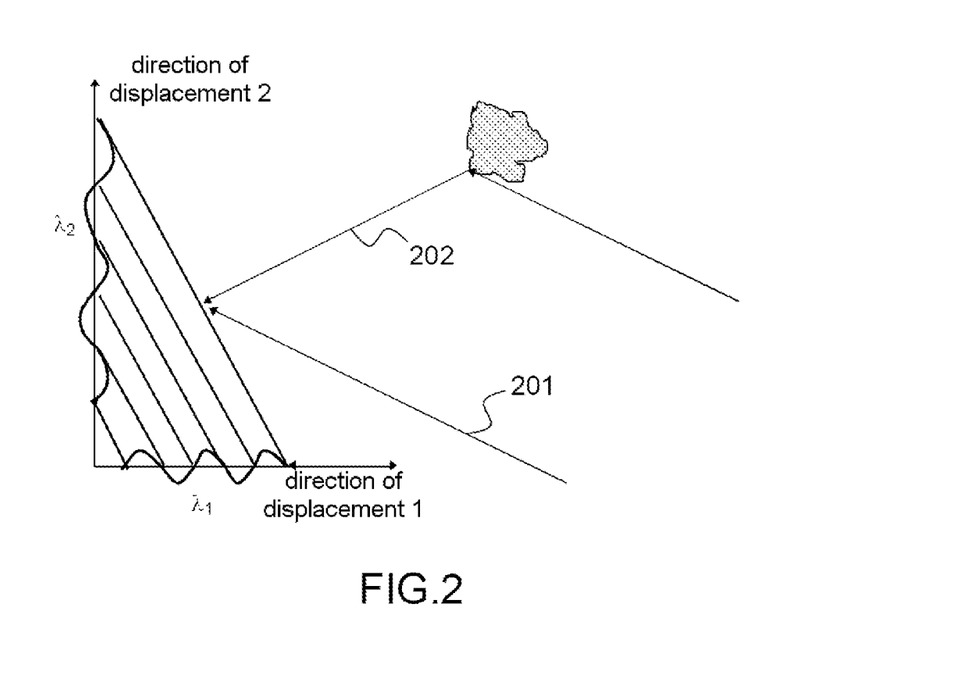
FIG. 2 presents the signal received directly and a signal received after a reflection.

FIG. 2 presents a signal received directly 201 and a signal received after a reflection 202.

The following notation is used hereinafter in the document:
$\delta F_d$ the doppler frequency of the signal on the direct path,
$\delta F_r$ the doppler frequency of the signal on the reflected path.

It is then possible to represent $\delta F_d$ in the form $$\delta F_d = F_0 \times \frac{V_{sa}}{c}.$$

In this equation:
$V_{sa}$ is the relative speed between the satellite and the phase center of the reception antenna,
c is the speed of light,
$F_0$ is the frequency of the carrier of the signal emitted.

The relative speed between the satellite and the phase center of the reception antenna, in the sighting axis of the satellite which axis is defined by the unit vector $\vec{d}$, is of the form:

$$V_{sa} = (\vec{V}_s - \vec{V}_a) \times \vec{d}$$

In the above equation $\vec{V}_s$ represents the speed vector of the satellite and $\vec{V}_a$ represents the speed vector of the antenna. Using the above expression it is possible to express $\delta F_d$ in the form:

$$\delta F_d = F_0 \times \frac{V_{sa}}{c} = F_0 \times \frac{(\vec{V}_s - \vec{V}_a) \times \vec{d}}{c}$$

In the case of the reflected signal, the frequency shift caused by the Doppler effect results from the addition of the frequency shift between the satellite and the specular reflection plane and of the frequency shift between the specular reflection plane and the phase center of the reception antenna. The frequency of the reflected signal is of the form:

$$F_{rr} = F_0 \times \left(1 + \frac{V_{sr}}{c}\right) \times \left(1 + \frac{V_{ra}}{c}\right)$$

In the above equation $V_{sr}$ represents the speed between the satellite and the reflection plane and $V_{ra}$ the speed between the reflection plane and the antenna.

The frequency shift, of the reflected signal, caused by the Doppler effect is therefore of the form:

$$\delta F_r = F_0 \times \left(1 + \frac{V_{sr}}{c}\right) \times \left(1 + \frac{V_{ra}}{c}\right) - F_0 = F_0 \times \left(\frac{V_{sr} + V_{ra}}{c} + \frac{V_{sr} \times V_{ra}}{c^2}\right)$$

In the case where the second-order term is neglected the expression is then of the form:

$$\delta F_r \approx F_0 \times \frac{V_{sr} + V_{ra}}{c}$$

The relative speed between the specular reflection plane and the phase center of the reception antenna, in the sighting axis of the reflected signal which is defined by the unit vector $\vec{r}$, is of the form:

$$V_{ra} = (\vec{V}_r - \vec{V}_a) \times \vec{r}$$

In the above equation $\vec{V}_r$ is the speed vector of the reflection plane.

Likewise the relative speed between the satellite and the specular reflection plane, in the sighting axis of the satellite which is defined by the unit vector $\vec{d}$ and by considering that the distance between the reception antenna and the specular reflection point is negligible compared with the distance between the satellite and the reception antenna or the specular reflection point, is of the form:

$$V_{sr} = (\vec{V}_s - \vec{V}_r) \times \vec{d}$$

The frequency shift, on the reflected path, caused by the applied Doppler effect may therefore be written:

$$\delta F_r \approx F_0 \times \frac{V_{sr} + V_{ra}}{c} = F_0 \times \frac{(\vec{V}_s - \vec{V}_r) \times \vec{d} + (\vec{V}_r - \vec{V}_a) \times \vec{r}}{c}$$

In the case where the reflection plane is fixed, then $\vec{V}_r = 0$, and therefore the above expression becomes:

$$\delta F_r \approx F_0 \times \frac{\vec{V}_s \times \vec{d} - \vec{V}_a \times \vec{r}}{c}$$

The signal received, a combination of the direct signal and of the reflected signal, can then be expressed in the form:

$$S(t) = S_d(t) + S_r(t)$$

With $$S_d(t) = A(t) \exp(2j\pi F_0 t) \exp(2j\pi \delta F_d t)$$

And $$S_r(t) = aA(t - \tau_0(t)) \exp(2j\pi F_0(t - \tau_0(t))) \exp(2j\pi \delta F_r(t - \tau_0(t)))$$

The various variables used in the above expressions are as follows:
A(t): amplitude of the direct signal received
a: attenuation of the amplitude of the reflected signal
t: current time
$F_0$: carrier frequency of the signal emitted
$\tau_0(t)$: propagation delay of the specular reflected path at the instant t.

By replacing the expressions for the frequency shifts caused by the Doppler effect, we obtain:

$$S(t) = A(t) \exp(2j\pi F_0 t) \exp\left(2j\pi F_0 \times \frac{(\vec{V}_s - \vec{V}_a) \times \vec{d}}{c} t\right) + aA(t - \tau_0(t))$$

$$\exp(2j\pi F_0(t - \tau_0(t))) \exp\left(2j\pi F_0 \times \frac{\vec{V}_s \times \vec{d} - \vec{V}_a \times \vec{r}}{c}(t - \tau_0(t))\right)$$

Or else:

$$S(t) = \exp(2j\pi F_0 t)\left[A(t)\exp\left(2j\pi F_0 \times \frac{(\vec{V}_s - \vec{V}_a) \times \vec{d}}{c} t\right) + \right.$$

$$aA(t - \tau_0(t)) \exp\left(2j\pi F_0 \frac{\vec{V}_s \times \vec{d} - \vec{V}_a \times \vec{r}}{c} t\right)$$

$$\left. \exp\left(-2j\pi F_0 \left(\frac{\vec{V}_s \times \vec{d} - \vec{V}_a \times \vec{r}}{c} + 1\right) \tau_0(t)\right)\right]$$

In the case where the term representing the frequency shift due to the Doppler effect caused by the displacement of the satellite is factorized, we obtain:

$$S(t) =$$

$$\exp\left(2j\pi F_0\left(1 + \frac{\vec{V}_s \times \vec{d}}{c}\right)t\right) \times \left[A(t)\exp\left(-2j\pi F_0 \times \frac{\vec{V}_a \times \vec{d}}{c} t\right) + aA(t - \tau_0(t))\right.$$

$$\left.\exp\left(-2j\pi F_0 \times \frac{\vec{V}_a \times \vec{r}}{c} t\right) \exp\left(2j\pi F_0 \times \left(\frac{\vec{V}_s \times \vec{d} - \vec{V}_a \times \vec{r}}{c} + 1\right) \tau_0(t)\right)\right]$$

The above expression comprises a first term dependent solely on the speed of the satellite, a second term dependent on the speed of the carrier to which is added a composite term whose phase depends on the displacement of the antenna with respect to the specular reflection plane, which constitutes the phase error term related to the reflected path.

In order to simplify the expression, we put:

$$V_{rd} = (\vec{V}_s - \vec{V}_a) \times \vec{d}$$

$$V_{rr} = \vec{V}_s \times \vec{d} - \vec{V}_a \times \vec{r}$$

The following expression is thus obtained:

$$S(t) = \exp(2j\pi F_0 t)\left[A(t)\exp\left(2j\pi F_0 \times \frac{V_{rd}}{c} t\right) + \right.$$

$$\left. \alpha A(t - \tau_0(t)) \exp\left(2j\pi F_0 \frac{V_{rr}}{c} t\right) \exp\left(-2j\pi F_0 \left(\frac{V_{rr}}{c} + 1\right) \tau_0(t)\right)\right]$$

The first term of the expression represents the direct signal whose phase term depends on the relative doppler between the satellite and the reception antenna. The second term represents the reflected signal delayed and phase-shifted by the value of the doppler related to the relative speed between the specular reflection point and the reception antenna.

If now an additional motion $\vec{V}_m$, known with respect to the displacement of the carrier $\vec{V}_p$, is imposed, we can write:

$$\vec{V}_a = \vec{V}_p + \vec{V}_m$$

Hence, replacing this term in the above expression for S(t) we obtain:

$$S(t) = \exp\left(2j\pi F_0\left(1 + \frac{\vec{V}_s \times \vec{d}}{c}\right)t\right) \times \left[A(t)\exp\left(-2j\pi F_0 \times \frac{(\vec{V}_p + \vec{V}_m) \times \vec{d}}{c} t\right) + \right.$$

$$\alpha A(t - \tau_0(t)) \exp\left(2j\pi F_0 \times \frac{(\vec{V}_p + \vec{V}_m) \times \vec{r}}{c} t\right)$$

$$\left. \exp\left(2j\pi F_0 \times \left(\frac{\vec{V}_s \times \vec{d} - (\vec{V}_p + \vec{V}_m) \times \vec{r}}{c} + 1\right) \tau_0(t)\right)\right]$$

The relative motion of the antenna and the displacement of the satellite being known, it is possible to correct their contributions induced on the phase of the reception signal, by compensating this phase by multiplying by the complex conjugate signal $S_L(t)$ (local signal also expressed by equation 1):

$$S_L(t) = \exp\left(-2j\pi F_0 \times \left(1 + \frac{\vec{V_s} \times \vec{d}}{c}\right)t\right)\exp\left(2j\pi F_0 \times \frac{\vec{V_m} \times \vec{d}}{c}t\right) \quad \text{(equation 1)}$$

In order to obtain the signal $S_R(t) = S(t) \times S_L(t)$ of the form:

$$S_R(t) = \exp\left(-2j\pi F_0 \times \frac{\vec{V_p} \times \vec{d}}{c}t\right)\Bigg[A(t) + $$
$$\alpha A(t-\tau_0(t))\exp\left(2j\pi F_0 \times \frac{(\vec{V_p}+\vec{V_m})\times\vec{r} + (\vec{V_p}+\vec{V_m})\times\vec{d}}{c}t\right)$$
$$\exp\left(2j\pi F_0 \times \left(\frac{\vec{V_s}\times\vec{d} - (\vec{V_p}+\vec{V_m})\times\vec{r}}{c} + 1\right)\tau_0(t)\right)\Bigg]$$

In the case where A(t) is stationary and has a value A the equation becomes:

$$S_R(t) = A\exp\left(-2j\pi F_0 \times \frac{\vec{V_p}\times\vec{d}}{c}t\right)\Bigg[1 + $$
$$\alpha\exp\left(2j\pi F_0 \times \frac{(\vec{V_p}+\vec{V_m})\times\vec{r} + (\vec{V_p}+\vec{V_m})\times\vec{d}}{c}t\right)$$
$$\exp\left(2j\pi F_0 \times \left(\frac{\vec{V_s}\times\vec{d} - (\vec{V_p}+\vec{V_m})\times\vec{r}}{c} + 1\right)\tau_0(t)\right)\Bigg]$$

In this expression the first term represents the expected carrier displacement measurement signal, the second term represents an unknown error signal. This error signal originates from the ignorance of the characteristics of the plane of reflection of the path.

The above expression can further be simplified to obtain equation 2:

$$S_R(t) = A\exp\left(-2j\pi F_0 \times \frac{\vec{V_p}\times\vec{d}}{c}t\right)\Bigg[1 + \quad \text{(Equation 2)}$$
$$\alpha\exp\left(2j\pi F_0 \times \frac{(\vec{V_p}+\vec{V_m})\times(\vec{r}+\vec{d})}{c}t\right)$$
$$\exp\left(2j\pi F_0 \times \left(\frac{\vec{V_s}\times\vec{d} - (\vec{V_p}+\vec{V_m})\times\vec{r}}{c} + 1\right)\tau_0(t)\right)\Bigg]$$

We denote by equation 3 the equation describing the error term $E_{Sr}(t)$ in the form $$E_{Sr}(t) = A\alpha\exp\left(-2j\pi F_0 \times \frac{\vec{V_p}\times\vec{d}}{c}t\right) \quad \text{(Equation 3)}$$
$$\exp\left(2j\pi F_0 \times \left(\frac{(\vec{V_p}+\vec{V_m})\times(\vec{r}+\vec{d})}{c}\right)t\right) \times$$
$$\exp\left(-2j\pi F_0 \times \left(\frac{\vec{V_s}\times\vec{d} - (\vec{V_p}+\vec{V_m})\times\vec{r}}{c} + 1\right)\tau_0(t)\right)$$

Considering the case of a fixed receiver (for example a ground signal observation station), for which $\vec{V_p}=0$, in this case the delay of the path reflected on a fixed reflection plane varies very slowly as a function of the elevation of the satellite and therefore:

$$E_{Sr}(t) = A\alpha\exp\left(2j\pi F_0 \times \left(\frac{\vec{V_m}\times(\vec{r}+\vec{d})}{c}\right)t\right) \times$$
$$\exp\left(-2j\pi F_0 \times \left(\frac{\vec{V_s}\times\vec{d} - \vec{V_m}\times\vec{r}}{c} + 1\right)\tau_0(t)\right)$$

Now, since $$\frac{\vec{V_s}\times\vec{d} - \vec{V_m}\times\vec{r}}{c} \ll 1,$$

because the speeds of displacement of the satellite and of the displacement of the phase center are very small with respect to c, then:

$$E_{Sr}(t) \approx A(t)\alpha\exp\left(2j\pi F_0 \times \left(\frac{\vec{V_m}\times(\vec{r}+\vec{d})}{c}\right)t\right) \times \exp(2j\pi F_0 \tau_0(t))$$

Typically the rotation period of the phase, $\exp(2j\pi F_0\tau_0(t))$, related to the variation of the elevation of the satellite is at least greater than a minute.

Having regard to the speed $\vec{V}_m$ imposed on the antenna (of the order of a few tens of centimeters per second, depending on the wavelength of the carrier of the signal received), the first term introduces a faster phase variation which thus allows the phase loop of the receiver to filter the phase error term.

$$2j\pi F_0 \times \left(\frac{\vec{V_m}\times(\vec{r}+\vec{d})}{c}\right)t \gg 2j\pi F_0\tau_0(t)$$

In the case where the receiver is installed on a mobile carrier, equation 3 hereinabove shows that the error term, related to the reflection on a fixed object, naturally affords a fast variation of the phase term and is therefore likewise filtered by the phase loop of the receiver.

However, the most troublesome phenomenon in the case of a mobile receiver originates from the reflection of the signal on the actual structure of the carrier (wings of an aircraft, the conning tower of a ship, etc.), which are in fact integral to the carrier and therefore fixed with respect to the antenna.

The introduction of an intentional motion on the antenna of the mobile carrier then plays the same role as in the case of a fixed receiver.

The receiver being mainly slaved to the phase of the direct signal (this signal generally being the most powerful), that is to say the first term of equation 2, the error term (see in particular equation 3) also corresponds to the phase error of the tracking loop in the presence of reflected path, and must therefore be taken into account when dimensioning the phase loop band of the receiver.

Figure 3:
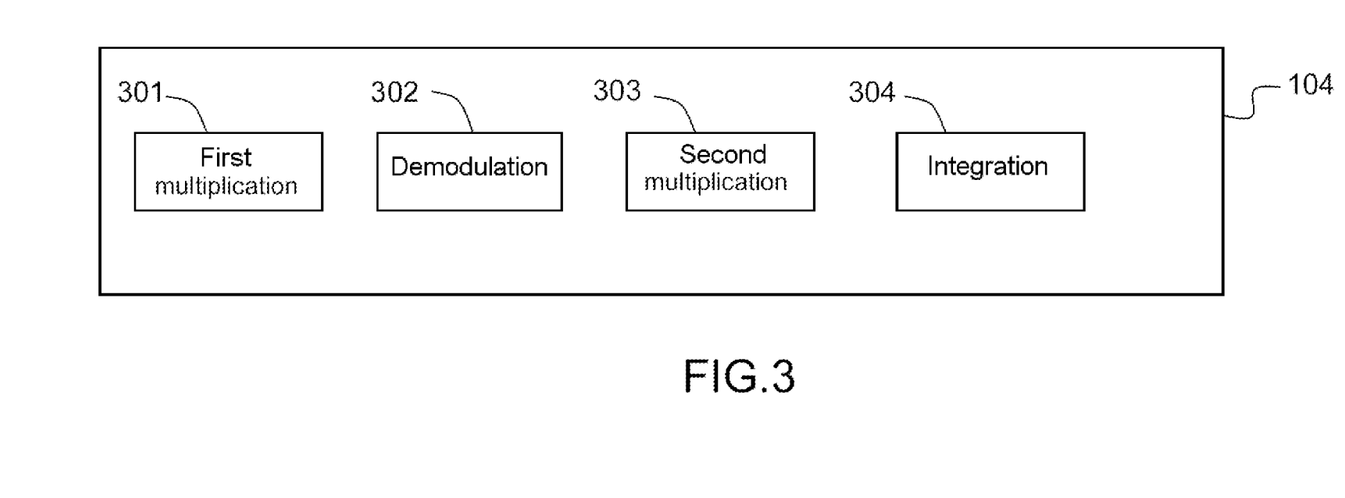
FIG. 3 presents the device for determining a location in accordance with one aspect of the invention.

The device 104 for determining a location such as presented in FIG. 3 comprises four units (301, 302, 303, 304). The unit 301 is adapted for performing a first multiplication of the satellite signal by an internally generated signal having a frequency whose value is the estimate of the frequency of the carrier of the satellite signal received. The unit 302 is adapted for demodulating a satellite signal. Devices for demodulating a satellite signal are known to the person skilled in the art. They generally perform a first step of correlation between the signal and a reconstruction of the internally generated signal of the receiver. Thereafter they perform a second step during which the correlated signal is integrated over a duration dependent on the period of the internally generated signal of the receiver. The elementary duration of integration can vary from 1 ms to 20 ms in the case of satellite signals using the GPS (Global Positioning System) standard, but may possibly attain 100 ms in the case of satellite signals using the Galileo standard. Indeed this integration is equal at the maximum to the duration of a data "bit" (otherwise, the change of phase of the data item degrades the signal-to-noise ratio), i.e. 20 ms in the case of signals using the GPS standard. On the other hand, in the case of signals using the Galileo standard, or of signals using future modifications of the GPS standard, the data signal is modulated in phase quadrature of a "pilot" pathway without data, permitting bigger coherent integration durations, up to 100 ms (corresponding to the duration of the periodic code of the pilot pathway). The unit 303 is adapted for performing a second multiplication of a signal by an internally generated signal of the receiver having a carrier phase which depends on the position of the phase center of the antenna. Finally a unit 304 performs an integration of a signal over a time period which depends on the period of displacement of the phase center.

Figure 4:
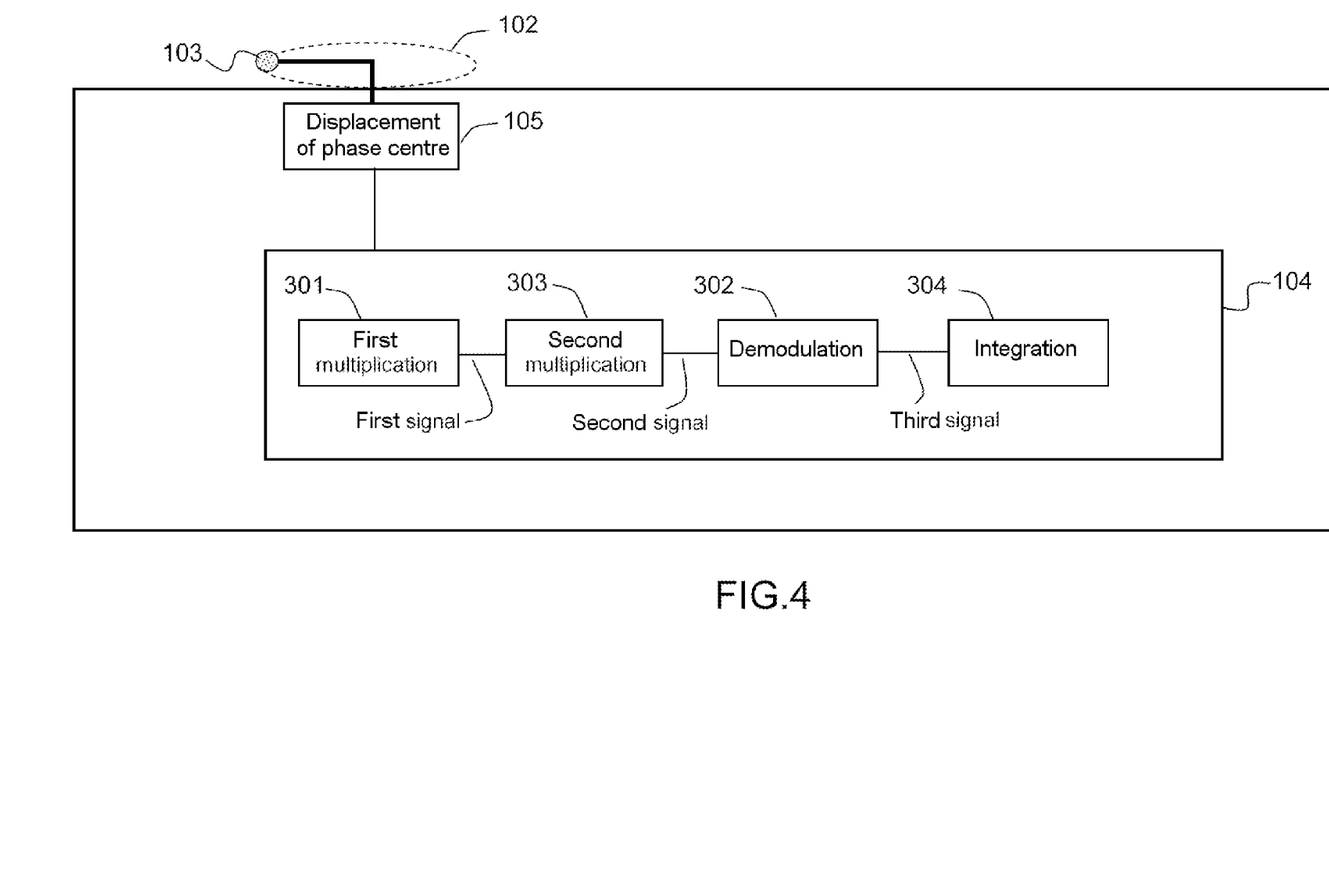
FIG. 4 presents a first embodiment of the device for determining a location in accordance with one aspect of the invention.

In a first embodiment represented in FIG. 4, the signal received from the mobile antenna is firstly multiplied, by means of the unit 301, by a signal of the form $$\exp\left(-2j\pi F_0 \times \left(1 + \frac{\vec{V}_s \times \vec{d}}{c}\right)t\right)$$

(see in particular equation 1). In this equation the different variables represent the following elements:

$\vec{V}_s$: is the speed of displacement of the antenna of the satellite (m/s)
c: Speed of the radio wave (m/s)
$F_0$: carrier frequency of emission of the signal (Hz)
$\vec{d}$: direction vector of the sighting axis of the satellite.

In the case where the speed of the satellite is not known or is not known perfectly various values of the frequency of the carrier are tested so as to traverse the set of possible frequencies of the carrier. This multiplication makes it possible to obtain a first signal. Thereafter the unit 303 makes it possible to multiply the first signal by a signal, obtained on the basis of equation 1, of the form $$\exp\left(2j\pi F_0 \times \left(1 + \frac{\vec{V}_m \times \vec{d}}{c}\right)t\right),$$

so that the phase of the carrier is corrected for the effect of the displacement of the phase center. In the above equation the different variables represent the following elements:

$\vec{V}_m$: relative speed vector of the motion imposed on the antenna with respect to the carrier reference frame
c: Speed of the radio wave
$F_0$: carrier frequency of emission of the signal (Hz)
$\vec{d}$: direction vector of the sighting axis of the satellite.

This multiplication makes it possible to obtain a second signal. Thereafter the second signal is demodulated, by means of the unit 302. Demodulation devices are known to the person skilled in the art. They comprise a first step of correlation between the signal and a reconstruction of the internally generated signal of the receiver. Thereafter in a second step the correlated signal is integrated over a duration dependent on the period of the internally generated signal of the receiver. This integration also makes it possible to use the decorrelation of the samples received, caused by the displacement of the receiver or of the phase center. Before correlation, the signal generated is shifted by a value dependent on the delay of the satellite signal received. If this delay is not known various shift assumptions are tested in order to find the delay of the satellite signal received. This unit 302 makes it possible to obtain a third signal. Finally this third signal is integrated, by means of the unit 304. This integration is performed over a duration dependent on the period of displacement of the antenna. It is necessary to integrate over duration at least equal to a period of the displacement cycle of the mobile antenna, so as to traverse a complete cycle of the carrier phase error, thus making it possible to average the error at the output of the code discriminator.

Figure 5:
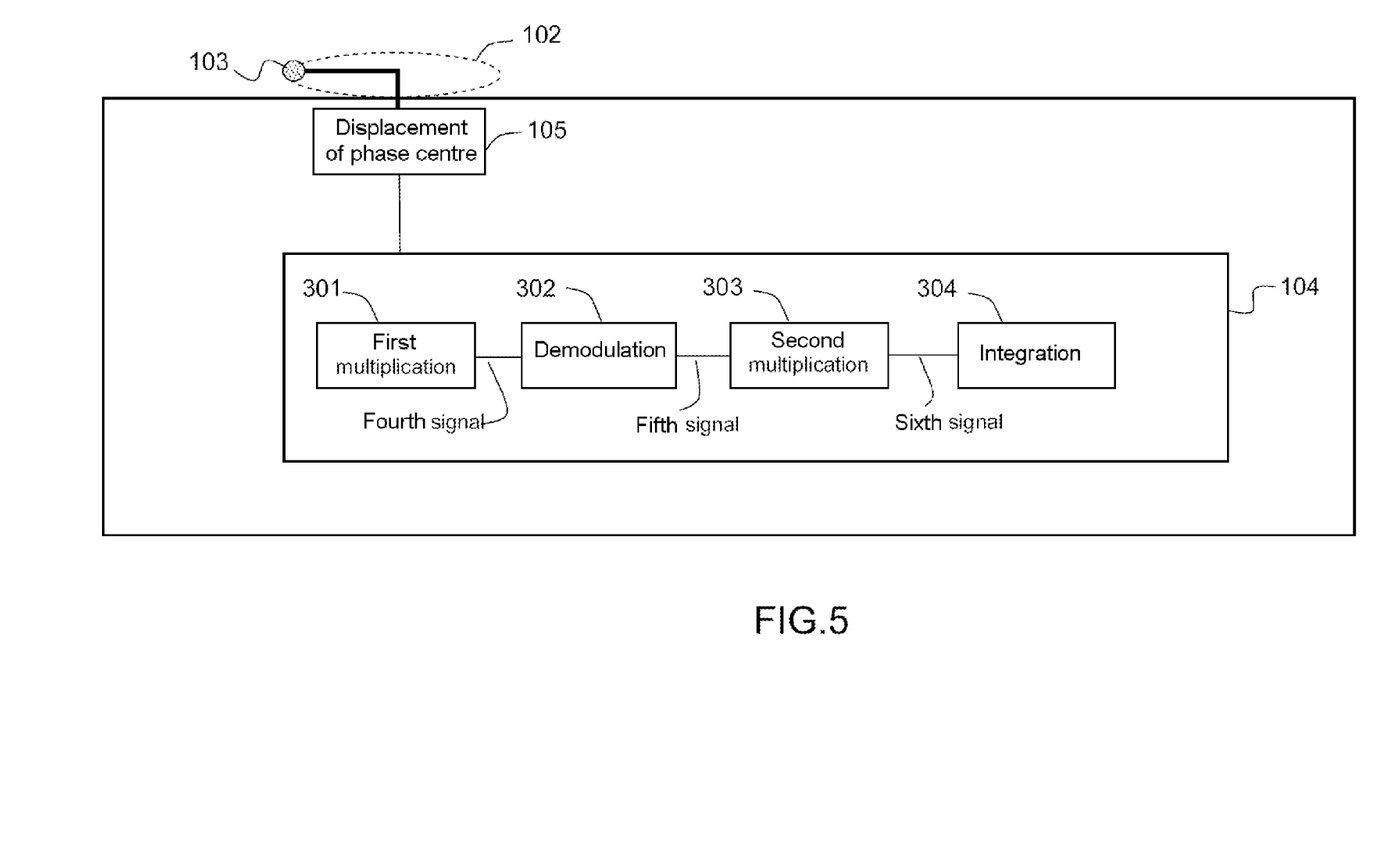
FIG. 5 presents a second embodiment of the device for determining a location in accordance with one aspect of the invention.

In a second embodiment represented in FIG. 5, the signal received from the mobile antenna is firstly multiplied, by means of the unit 301, by a signal of the form $$\exp\left(-2j\pi F_0 \times \left(1 + \frac{\vec{V}_s \times \vec{d}}{c}\right)t\right)$$

(see in particular equation 1). In this equation the different variables represent the following elements:

$\vec{V}_s$: is the speed of displacement of the antenna of the satellite (m/s)
c: Speed of the radio wave (m/s)
$F_0$: carrier frequency of emission of the signal (Hz)
$\vec{d}$: direction vector of the sighting axis of the satellite.

In the case where the speed of the satellite is not known, or is not known perfectly, various values of the frequency of the carrier are tested so as to traverse the set of possible frequencies of the carrier. This multiplication makes it possible to obtain a fourth signal. Thereafter this fourth signal is demodulated, by means of the unit 302. Demodulation devices are known to the person skilled in the art. They comprise a first step of correlation between the signal and a reconstruction of the internally generated signal of the receiver. Thereafter in a second step the correlated signal is integrated over a duration dependent on the period of the internally generated signal of the receiver. This integration also makes it possible to use the decorrelation of the samples received, caused by the displacement of the receiver or of the phase center. Before correlation, the signal generated is shifted by a value dependent on the delay of the satellite signal received. If this delay is not known, various shift assumptions are tested in order to find the delay of the satellite signal received. The demodulation unit 302 makes it possible to obtain a fifth signal. Thereafter the fifth signal is multiplied, by means of the unit 303, by a signal obtained on the basis of equation 1, of the form $$\exp\left(2j\pi F_0 \times \left(1 + \frac{\vec{V}_m \times \vec{d}}{c}\right)t\right),$$

so that the phase of the carrier is corrected for the effect of the displacement of the phase center. In the above equation the different variables represent the following elements:

$\vec{V}_m$: relative speed vector of the motion imposed on the antenna with respect to the carrier reference frame c: Speed of the radio wave $F_0$: carrier frequency of emission of the signal (Hz)

$\vec{d}$: direction vector of the sighting axis of the satellite

This multiplication makes it possible to obtain a sixth signal. Finally this sixth signal is integrated, by means of the unit 304. This integration is performed over a duration dependent on the period of displacement of the antenna. It is necessary to integrate over duration at least equal to a period of the displacement cycle of the mobile antenna, so as to traverse a complete cycle of the carrier phase error, thus making it possible to average the error at the output of the code discriminator.

Figure 6:
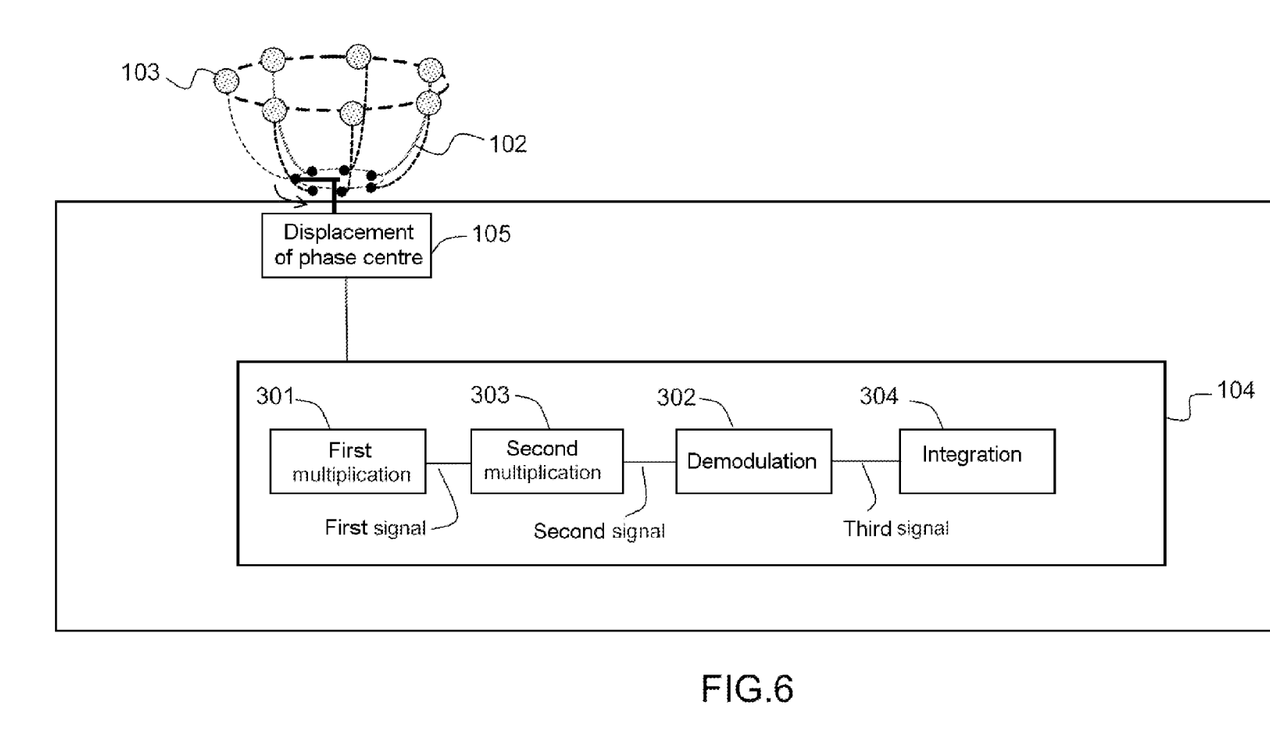
FIG. 6 presents a third embodiment of the device for determining a location in accordance with one aspect of the invention.
Figure 7:
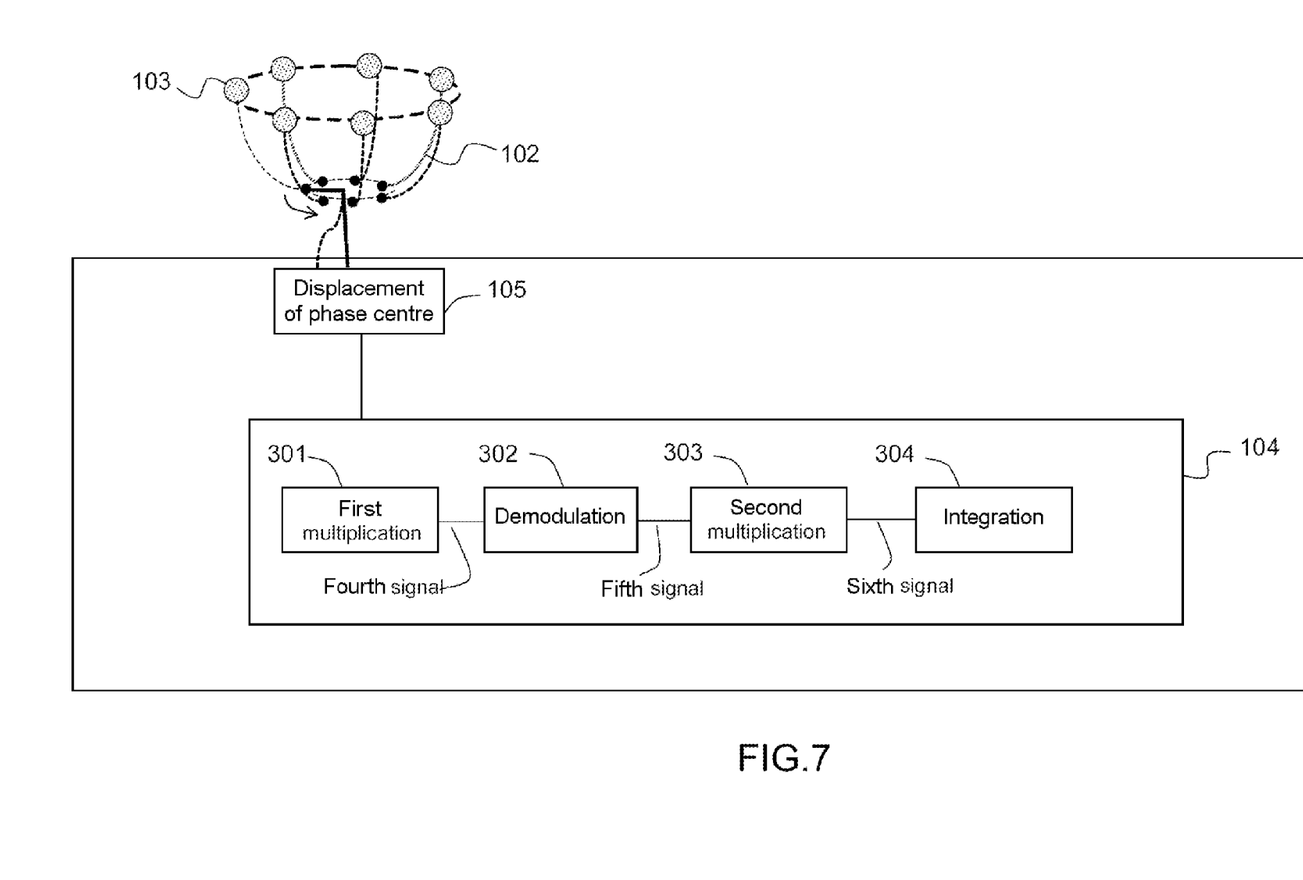
FIG. 7 presents a fourth embodiment of the device for determining a location in accordance with one aspect of the invention.

In the other two embodiments presented in FIGS. 6 and 7, the antenna 102 possesses several phase centers 103. This is for example achievable if the antenna 102 consists of a set of elementary antennas. These elementary antennas constitute an array of pointlike antennas with different and known positions. These various elementary antennas are used successively over time. The signals arising from these antennas are distributed sequentially to the input of the device 103 for determining a location. This sequential distribution is carried out by an electronic switch. The antenna is therefore not subjected to a physical motion, and this facilitates its mechanical mounting, improves the reliability of the installation, facilitates its servicing and avoids phenomena of wear (in particular by virtue of the absence of any motor for ensuring displacement). Once the installation of the antenna array has been referenced spatially (in particular after having determined the geographical position and the orientation of the various elementary antennas), the choice of one of the antennas is ensured by a switching that is synchronized with the device 103 for determining a location. It is then possible to perform a compensation for the effect of the displacement of the phase center, by using processing operations identical to those used in the first two embodiments (FIG. 3 and FIG. 4). Moreover, in order to improve the system and to limit phase breaks related to the switching transitions, the integration unit 304 must carry out the integration in a manner synchronous with the switchings of the input signals.

The invention claimed is:

1. A receiver of satellite signals serving for location adapted to be fixed on a support comprising:
    at least one antenna able to receive the satellite signals serving for location, the antenna comprising at least two mobile phase centers,
    determination means for determining a location on the basis of the satellite signals received, and
    displacement device for displacing the phase centers for selecting one of the phase centers and for determining a position of the selected phase center with respect to the support,
    wherein said determination means is configured to determine a location, on the basis of said position of the selected phase center with respect to the support, said position being transmitted by said displacement device, by correction of a variation of the phase of the signal received, the variation being caused by the displacement of the selected phase center,
    wherein said determination means for determining a location include:
        a first sub-means for multiplying the satellite signal by a signal generated in the receiver and having a frequency dependent on the frequency of the carrier of the satellite signal, in order to obtain a first signal,
        a second sub-means for multiplying the first signal by another signal generated in the receiver and having a carrier phase dependent on the position of the phase center, in order to obtain a second signal,
        a sub-means for demodulating the second signal, in order to obtain a third signal, and
        a sub-means for integrating the third signal over a period dependent on the period of displacement of the phase center.

2. The receiver according to claim 1, in which said displacement means are adapted for displacing at least one of the reception antennas.

3. The receiver according to claim 2, in which said determination means for determining a location include:
    a third sub-means for multiplying the satellite signal by a first additional signal generated in the receiver and having a frequency dependent on the frequency of the carrier of the satellite signal, in order to obtain a fourth signal,
    a fourth sub-means for demodulating the fourth signal, in order to obtain a fifth signal,
    a fifth sub-means for multiplying the fifth signal by a second additional signal generated in the receiver and having a carrier phase dependent on the position of the phase center, in order to obtain a sixth signal,
    a sixth sub-means for integrating the sixth signal over a period dependent on the period of displacement of the said phase center.

4. The receiver according to claim 1, in which said determination means for determining a location include:
    a third sub-means for multiplying the satellite signal by a first additional signal generated in the receiver and having a frequency dependent on the frequency of the carrier of the satellite signal, in order to obtain a fourth signal,
    a fourth sub-means for demodulating the fourth signal, in order to obtain a fifth signal,
    a fifth sub-means for multiplying the fifth signal by a second additional signal generated in the receiver and having a carrier phase dependent on the position of the phase center, in order to obtain a sixth signal,
    a sixth sub-means for integrating the sixth signal over a period dependent on the period of displacement of the phase center.

5. The receiver according to claim 1, in which said second sub-means are adapted for generating a signal having a frequency dependent on the projection of the speed of a displacement vector of the phase center in the direction of a reception of the satellite signal.

* * * * *